United States Patent
Uchida

(10) Patent No.: US 7,202,968 B2
(45) Date of Patent: Apr. 10, 2007

(54) PRINT LAYOUT APPARATUS AND METHOD

(75) Inventor: Tatsuro Uchida, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 881 days.

(21) Appl. No.: 10/334,916

(22) Filed: Jan. 2, 2003

(65) Prior Publication Data
US 2003/0133158 A1 Jul. 17, 2003

(30) Foreign Application Priority Data
Jan. 16, 2002 (JP) ............... 2002-007986

(51) Int. Cl.
*G06F 15/00* (2006.01)

(52) U.S. Cl. .............. 358/1.18; 399/187; 347/248; 358/1.15

(58) Field of Classification Search .......... 358/1.15, 358/488, 1.18, 1.12, 451; 399/187, 394; 347/248
See application file for complete search history.

(56) References Cited

U.S. PATENT DOCUMENTS

| | | | | |
|---|---|---|---|---|
| 4,941,017 A | * | 7/1990 | Mishima et al. | 399/193 |
| 5,005,477 A | * | 4/1991 | Schroeder | 101/415.1 |
| 5,210,622 A | * | 5/1993 | Kelley et al. | 358/451 |
| 5,374,130 A | * | 12/1994 | Hirono | 400/68 |
| 5,512,986 A | * | 4/1996 | Toyomura et al. | 399/60 |
| 5,828,794 A | * | 10/1998 | Katayama et al. | 382/298 |
| 5,839,033 A | * | 11/1998 | Takahashi et al. | 399/187 |
| 6,625,331 B1 | * | 9/2003 | Imaizumi et al. | 382/294 |
| 6,667,756 B2 | * | 12/2003 | Conrow et al. | 347/248 |
| 6,982,808 B1 | * | 1/2006 | Ogg et al. | 358/1.18 |
| 7,038,795 B2 | * | 5/2006 | Kaneko et al. | 358/1.12 |
| 2001/0043359 A1 | * | 11/2001 | Mori et al. | 358/1.15 |
| 2001/0053300 A1 | * | 12/2001 | Endo et al. | 399/394 |
| 2003/0133141 A1 | | 7/2003 | Toda et al. | 358/1.13 |
| 2003/0214685 A1 | * | 11/2003 | Suzuki | 358/488 |

* cited by examiner

*Primary Examiner*—Kimberly Williams
*Assistant Examiner*—Ashish K. Thomas
(74) *Attorney, Agent, or Firm*—Fitzpatrick, Cella, Harper & Scinto

(57) ABSTRACT

This invention relates to a technique that prevents an image from falling outside a given range when a printer is controlled to form an image on an arbitrary medium while assuring a margin of a predetermined amount. A host computer shifts an image by only a partial amount of a target margin amount in a predetermined direction within an effective print range of a medium. Furthermore, the host computer controls a printer to form the image by further shifting the image by nearly the remaining amount of the target margin amount so as to form an image within the effective print range. In this way, since the host computer and printer add a margin in two steps, print data can be prevented from falling outside a given range upon processing a binding margin on the printer side.

14 Claims, 9 Drawing Sheets

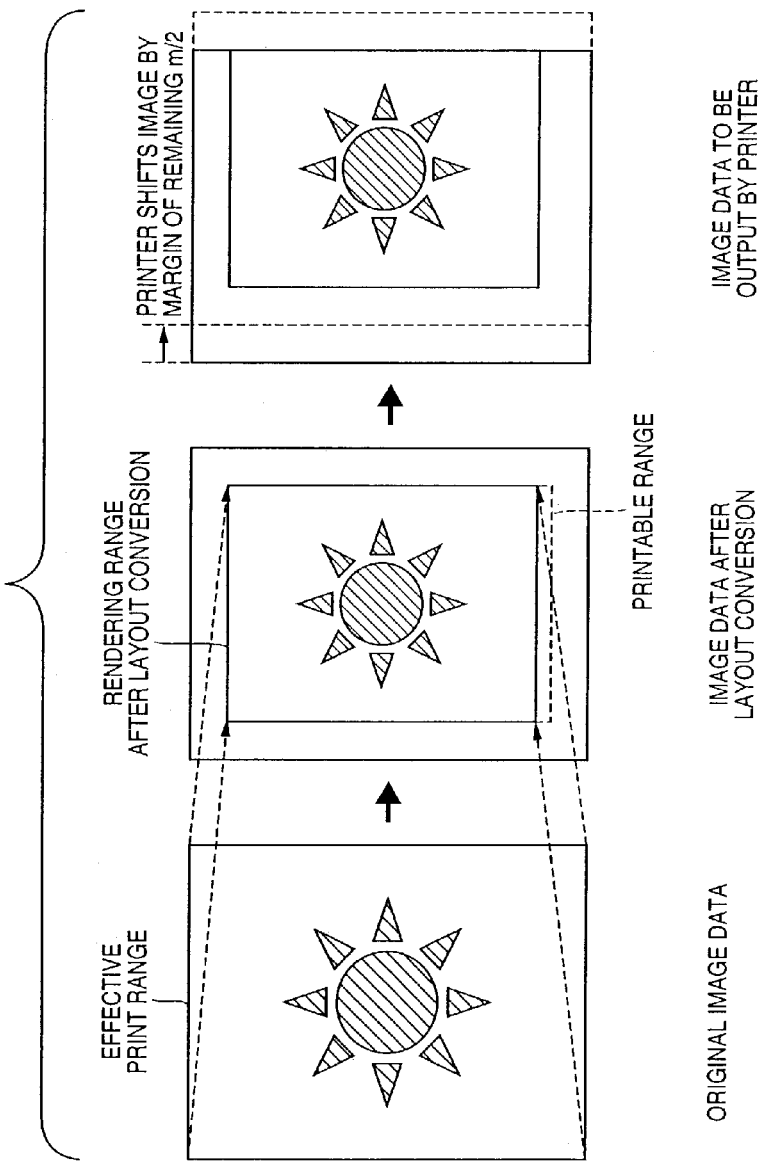

IN CASE OF STAPLING

IN CASE OF TWO-FOLDING PAPER SHEET

IN CASE OF PUNCHING HOLES

FIG. 9

PRINT LAYOUT APPARATUS AND METHOD

RELATED APPLICATION

This application claims priority from and incorporates herein by reference the entire disclosure of Japanese Patent Application No. 2002-007986, filed Jan. 16, 2002.

FIELD OF THE INVENTION

This invention relates to a print layout technique and, more particularly, to a print layout technique which is suitably used in a print process while assuring a margin such as a binding margin or the like in a print system which comprises an information processing apparatus such as a personal computer or the like, and a printing apparatus such as a printer or the like.

BACKGROUND OF THE INVENTION

A conventional binding margin setup process (margin setup) in a print process by a printer merely shifts the print positions in the right-and-left or up-and-down direction in correspondence with the binding margin. For this reason, print data may fall outside an effective print range of a paper sheet depending on the selected binding margin. Normally, since print data which falls outside the effective print range is not printed, only an unnatural print result like a partial image can be obtained.

As one related art of processes for forming a binding margin, an information processing apparatus shifts print data by a distance designated by the binding margin, reduces the print data so that an image can fall within the effective print range of a paper sheet, and transfers the shifted and reduced print data to a printing apparatus. Note that the effective print range is a maximum range in which the printing apparatus can form an image. Since this effective print range varies depending on the characteristics of a printing apparatus, it often varies in each printing apparatus. Hence, a margin cannot be normally formed or an end of an image to be formed is not formed unless the characteristics of each printing apparatus are fully considered.

Nevertheless, since this related art is premised on that the shift and reduction processes of print data associated with the binding margin are executed only on the information processing apparatus side and the printing apparatus does nothing, none of individual characteristics of a paper feed process, exhaust process, and the like of each printing apparatus are reflected. The characteristics of each printing apparatus are determined by, e.g., the paper convey direction of each paper sheet, the types of option devices that pertain to the paper feed and exhaust processes, the mounted states of such option devices, and the like. These characteristics greatly influence formation of a margin.

There are a wide variety of characteristics of printing apparatuses, and also a wide variety of ways in which the margin is used. In addition to the aforementioned binding margin, a margin is used in a punch, two-fold, Z-fold, or staple process. Such processes are also strongly restricted by a printing apparatus and paper feed and exhaust mechanisms attached to that apparatus.

Since there are a wide variety of characteristics of printing apparatuses, and also a wide variety of ways in which the margin is used, it is very difficult to recognize all combinations of them on the information processing apparatus side, and to appropriately form a margin by only a process on the information processing apparatus side.

Hence, the final layout process of a binding margin must be done on the printing apparatus side. However, even in such case, image data is preferably avoided from falling outside the effective print range.

Also, when a print job that includes a plurality of pages with different paper sizes or with different print directions undergoes a binding margin process, there are a great variety of logical combinations. Such combinations are determined by various conditions of the printing apparatus, and paper feed and exhaust mechanisms, but the binding method that the user did not intend may be used depending on these conditions. The user cannot recognize the actual binding method, and can hardly image an output result in association with the binding margin setup.

SUMMARY OF THE INVENTION

Accordingly, it is an object of the present invention to minimize any change that print data falls outside the effective print range when a binding margin is processed on the printing apparatus side.

It is another object of the present invention to allow to set a binding margin corresponding to the characteristics of the printing apparatus side by presenting a plurality of binding methods to the user and prompting him or her to select one of them when a print document consisting of a plurality of pages with different paper sizes or different print directions is to be sorted.

In order to achieve the above objects, according to the first aspect of the present invention, upon forming an image on an arbitrary medium by an image forming apparatus while assuring a margin of a given amount, control is made to form a partial amount of the margin by the information processing apparatus side and to form the remaining amount of the margin by the printing apparatus side. In this manner, since conditions unique to the printing apparatus can be reflected in formation of the margin, the probability that print data falls outside the effective print range can be reduced upon forming the margin.

According to the second aspect of the present invention, when a plurality of pages with different sizes or different print directions of paper sheets are mixed, some possible combinations of binding margin positions are displayed, one of the displayed combinations is designated, and the margin amount is set on the basis of the designated combination. Since the user can visually recognize possible combinations of binding margin positions when a plurality of pages with different sizes or different print directions of paper sheets are mixed, difficulty in designation of the binding margin position can be relaxed.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 7 shows a layout example of image data according to the embodiment;

FIG. 9 shows an example of a binding margin setup window when various paper sheets are used.

DETAILED DESCRIPTION OF THE PREFERRED EMBODIMENTS

Preferred embodiments of the present invention will now be described in detail in accordance with the accompanying drawings.

First Embodiment

Figure 1:
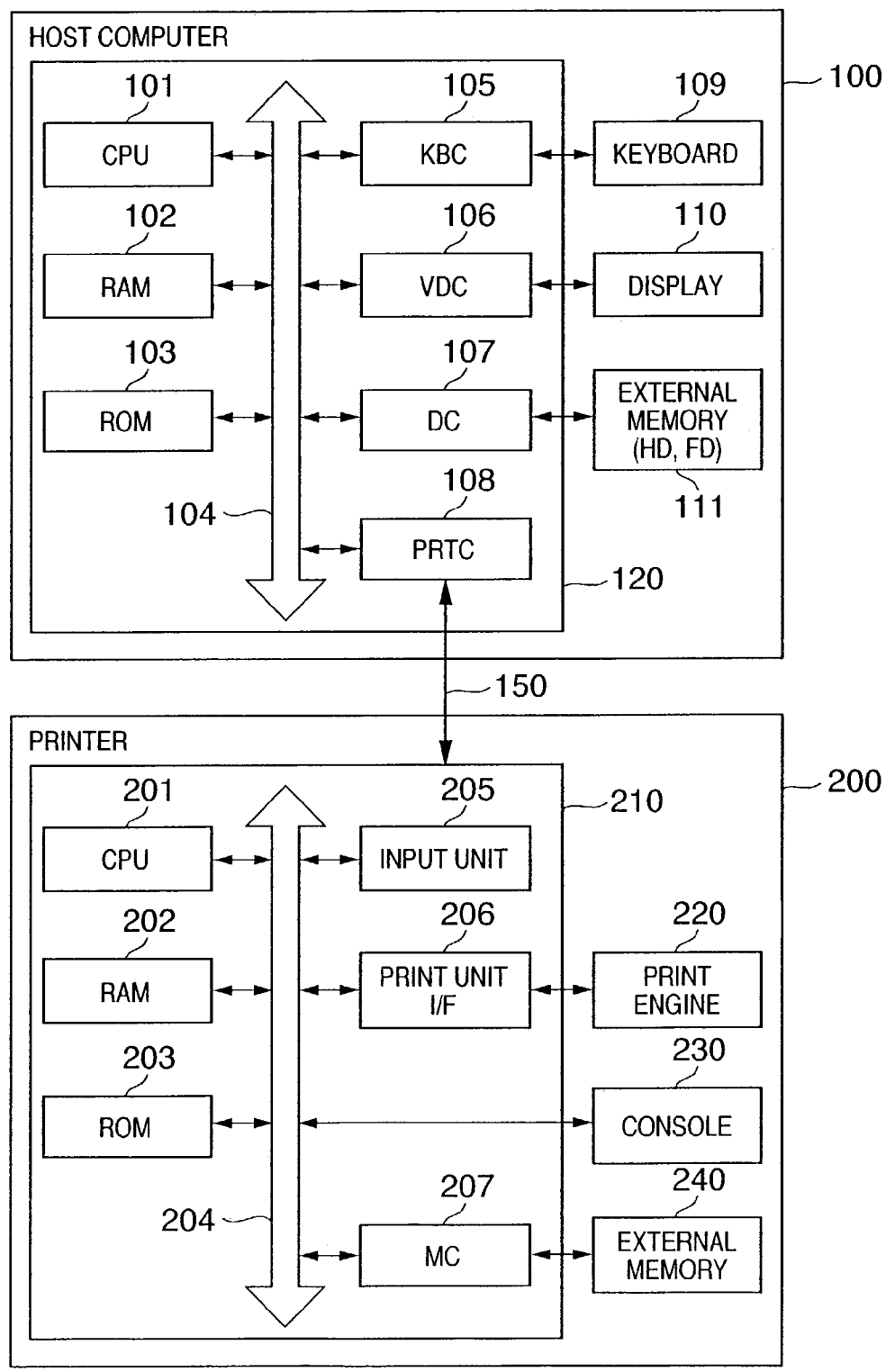
FIG. 1 is a block diagram showing the system arrangement according to an embodiment of the present invention.

FIG. 1 is a block diagram showing an example of the arrangement of a printer control system according to an embodiment of the present invention. The present invention is not limited to the system arrangement shown in FIG. 1 as long as the functions of the present invention are implemented. For example, the present invention can be equally applied to a standalone apparatus, a system including a plurality of apparatuses, or a system which connects apparatuses via a network such as a LAN (Local Area Network), WAN (Wide Area Network), or the like to execute processes. A computer program according to the present invention can be recorded on a magnetic disk such as a FD (Flexible Disk) or the like, or an optical disk such as a CD-ROM (Compact Disk ROM) or the like, and can be supplied to the printer control system. Also, the program can be saved in a Web site of the Internet or BBS (Bulletin Board System; a message exchange system using computers), and can be supplied to the printer control system when that printer control system establishes connection to such Web site or the like.

The printer control system according to this embodiment comprises a host computer 100 and printer 200. The host computer 100 comprises a CPU 101, RAM 102, ROM 103, keyboard controller (KBC) 105, video controller (VDC) 106, disk controller (DC) 107, printer controller (PRTC) 108, keyboard 109, display 110, and external memory 111.

The printer 200 comprises a CPU 201, RAM 202, ROM 203, input unit 205, print unit interface (I/F) 206, memory controller (MC) 207, printer engine 220, console 230, external memory 240, and the like. In this embodiment, the printer 200 is used as an image forming apparatus. However, the present invention is not limited to this, and can be applied to a copying machine, facsimile, hybrid machine, and the like as long as they can form images.

The arrangement of the respective units of the host computer 100 will be described in detail first. The CPU 101 is a central processing unit for systematically controlling respective devices connected to a system bus 104, and executes a document process of a document that includes graphics data, image data, text data, table data (including a spreadsheet), and the like on the basis of a document processing program stored in a program area of the ROM 103 or in the external memory 111.

The CPU 101 executes a rasterize process of outline fonts on a display information RAM assured on, e.g., the RAM 102, and controls the display 110 to display information which is rasterized and stored in the display information RAM via the video controller (VDC) 106. In this way, WYSIWYG (What You See Is What You Get: a function capable of printing an image with a size and shape displayed on the display intact) is achieved. Furthermore, the CPU 101 opens various registered windows and executes various data processes in accordance with commands designated by a mouse cursor (not shown) or the like on the display 110. The user opens a window associated with a print setup and sets a print processing method for a printer driver including the setup of the printer 200 and selection of a print mode upon executing a print process using the printer 200.

The RAM 102 serves as a main memory, work area, and the like of the CPU 101. The ROM 103 is divided into a font area, program area, and data area. The font area or external memory 111 stores font data and the like used upon executing the aforementioned document process. The program area or external memory 111 stores a BIOS (Basic Input Output System), operating system (to be referred to as an OS hereinafter), and the like as control programs of the CPU 101. The data area or external memory 111 stores various data used upon executing the aforementioned document process.

The keyboard controller (KBC) 105 controls key inputs from the keyboard 109 and a pointing device (not shown). The video controller (VDC) 106 controls display of the display 110. The disk controller (DC) 107 controls access to the external memory 111. The printer controller (PRTC) 108 is connected to the printer 200 via a two-way interface 150 to execute a communication control process with the printer 200. The keyboard 109 has various keys. The display 110 displays graphics, images, text, tables, and the like.

The external memory 111 comprises a hard disk (HD), flexible disk (FD), or the like, and is used as an area for storing a boot program, OS (operating system), various applications, font data, user files, edit files, printer control command generation program (to be referred to as a printer driver hereinafter), and the like. Note that the external memory may comprise a magnetic disk other than the flexible disk and hard disk, an optical disk, a magnetooptical disk, a large-capacity memory, or the like.

The aforementioned CPU 101, RAM 102, ROM 103, keyboard controller (KBC) 105, video controller (VDC) 106, disk controller (DC) 107, and printer controller (PRTC) 108 are arranged on a computer control unit 120.

With the above arrangement, an information processing apparatus (e.g., host computer 100) that controls an image forming apparatus (e.g., printer 200) to form an image on an arbitrary medium while assuring a margin of a predetermined amount implements a first shift component (e.g., CPU 101) which shifts the image in a predetermined direction by a partial amount of the predetermined amount within an effective print range of the medium, and a second shift component (e.g., CPU 101 and/or PRTC 108) which further shifts the image by nearly the remaining amount of the predetermined amount to form the image within the effective print range.

The information processing apparatus may be formed to include a setting component which sets a first margin amount (e.g., a target margin amount designated by the user) associated with a margin region assured on a medium, an enlargement/reduction component which enlarges or reduces data associated with an image in accordance with a second margin amount (e.g., half the target margin amount) smaller than the first margin amount, and a control component which controls the image forming apparatus to form an image on the medium with a third margin amount obtained via a calculation (e.g., subtraction or the like) of the first and second margin amounts.

Note that the second and third margin amounts may assume any values as long as the first margin region designated by the user is formed, and an image can be prevented from falling outside the effective print range as a result of the print process.

The apparatus may further comprise a calculation component which calculates a printable range which is obtained by reducing the effective print range of the medium in accordance with the second margin amount, and the enlargement/reduction component may enlarge or reduce data so that the data associated with the image falls within the printable range. The control component may send to the image forming apparatus information associated with a side or direction along which the third margin amount is to be assured.

Furthermore, the apparatus may further comprise a display component which displays all or some of possible combinations of binding margin positions when a plurality of pages with different paper sizes or different print directions are mixed, and a designation component which designates one of the displayed combinations.

The arrangement of the respective units of the printer 200 will be described below. The CPU 201 is a central processing unit for systematically controlling respective devices connected to a system bus 204, and outputs an image signal as output information to the printer engine 220 on the basis of a control program or the like stored in a program area of the ROM 203 or a control program or the like stored in the external memory 240. The CPU 201 can execute a communication process with the host computer 100 via the input unit 205, and can inform the host computer 100 of information and the like in the printer 200.

The RAM 202 serves as a main memory, work area, and the like of the CPU 201, and its memory size can be expanded by connecting an option RAM (not shown) to an expansion port. Note that the RAM 202 is used as an output information rasterize area, environment data storage area, NVRAM, and the like. The ROM 203 is divided into a font area, program area, and data area. The font area stores font data and the like used upon generating the output information. The program area stores a control program and the like of the CPU 201. The data area stores information and the like used on the host computer 100 if no external memory 240 (hard disk or the like) is connected to the printer 200. The external memory 240 comprises a hard disk (HD), IC card, or the like, and is connected to the printer 200 as an option. The external memory 240 stores font data, an emulation program, form data, and the like, and its access is controlled by the memory controller (MC) 207. Note that the number of external memories 240 is not limited to one, but a plurality of external memories may be connected. That is, a plurality of option cards in addition to built-in fonts and external memories that store programs for interpreting printer control languages of different language systems may be connected to the printer 200. Furthermore, the external memory may have an NVRAM (not shown), and may store printer mode setup information input from the console 230.

The input 205 exchanges data between the printer 200 and host computer 100 via the two-way interface 150. The print unit interface (I/F) 206 exchanges data between the CPU 201 and print engine 220. The memory controller (MC) 207 controls access to the external memory 240. The print engine 220 executes an actual print operation under the control of the CPU 201, comprises a convey mechanism of print media, semiconductor laser unit, photosensitive drum, developing unit, fixing unit, drum cleaning unit, separation unit, and the like (none of them are shown), and prints image by a known electrophotography process. The console 230 comprises switches for various operations, a display unit (e.g., an LED display), and the like.

The aforementioned CPU 201, RAM 202, ROM 203, input unit 205, print unit interface (I/F) 206, and memory controller (MC) 207 are arranged on a printer control unit 210.

Figure 2:
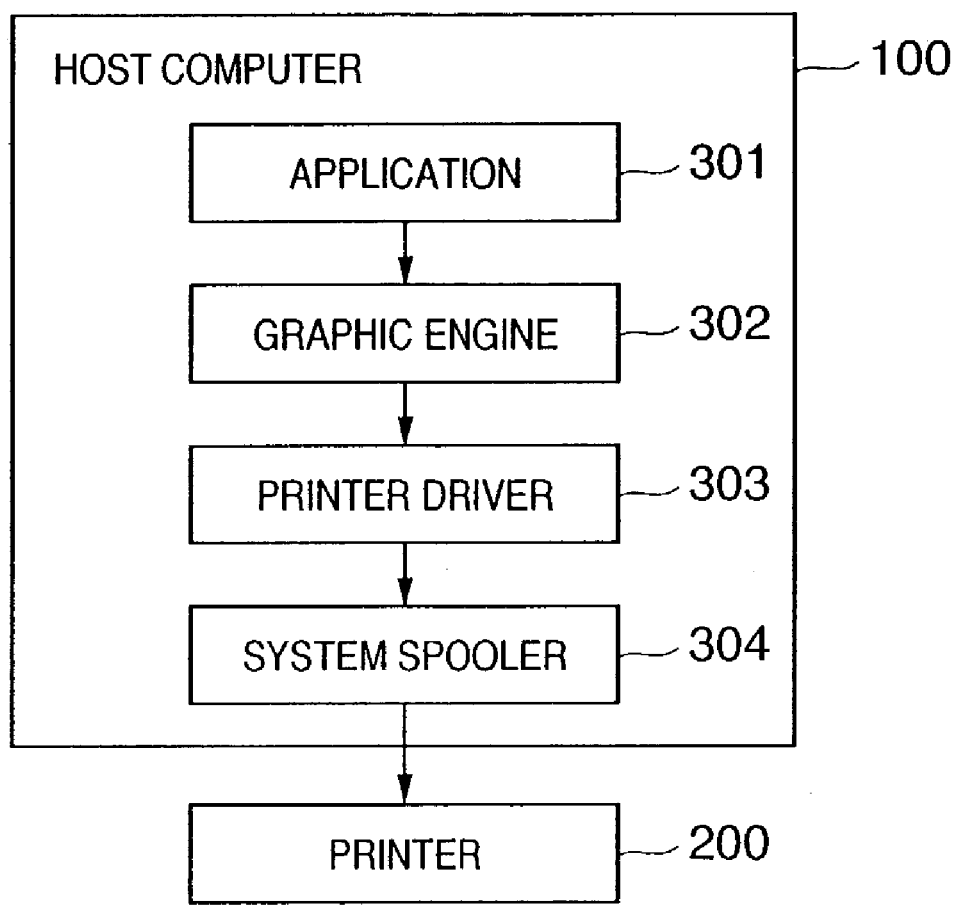
FIG. 2 is a block diagram that pertains to print processing functions of a host computer.

FIG. 2 is a block diagram showing the arrangement of a typical print process in the host computer 100 to which a printing apparatus such as a printer or the like is connected directly or via a network. Referring to FIG. 2, an application 301, graphic engine 302, printer driver 303, and system spooler 304 are program modules, and are stored as files in the external memory 111. Upon executing a given program module, the program module is loaded onto the RAM 102 by the OS or another module which uses that module, and is then executed. The application 301 and printer driver 303 can be added to an HD as another external memory 111 via an FD or CD-ROM as one of the external memories 111 or a network (not shown).

The application 301 saved in the external memory 111 is loaded onto the RAM 102, and is executed. When a print instruction is issued from the application 301 to the printer 200, an output (rendering) process is done using the graphic engine 302 which is similarly loaded onto the RAM 102 and is ready to be executed. The graphic engine 302 similarly loads a printer driver 303 prepared for each printing apparatus from the external memory 111 onto the RAM 102, and sets the output from the application 301 in the printer driver 303. Furthermore, a GDI (Graphic Device Interface) function received from the application 301 is converted into a DDI (Device Driver Interface) function, which is output to the printer driver 303.

The printer driver 303 converts the DDI function received from the graphic engine 302 into a control command, e.g., PDL (Page Description Language) that the printer can interpret. The converted printer control command is passed to the system spooler 304 which is loaded onto the RAM 102 by the OS. The system spooler 304 outputs the printer control command to the printer 200 as print data via the interface 150.

Figure 3:
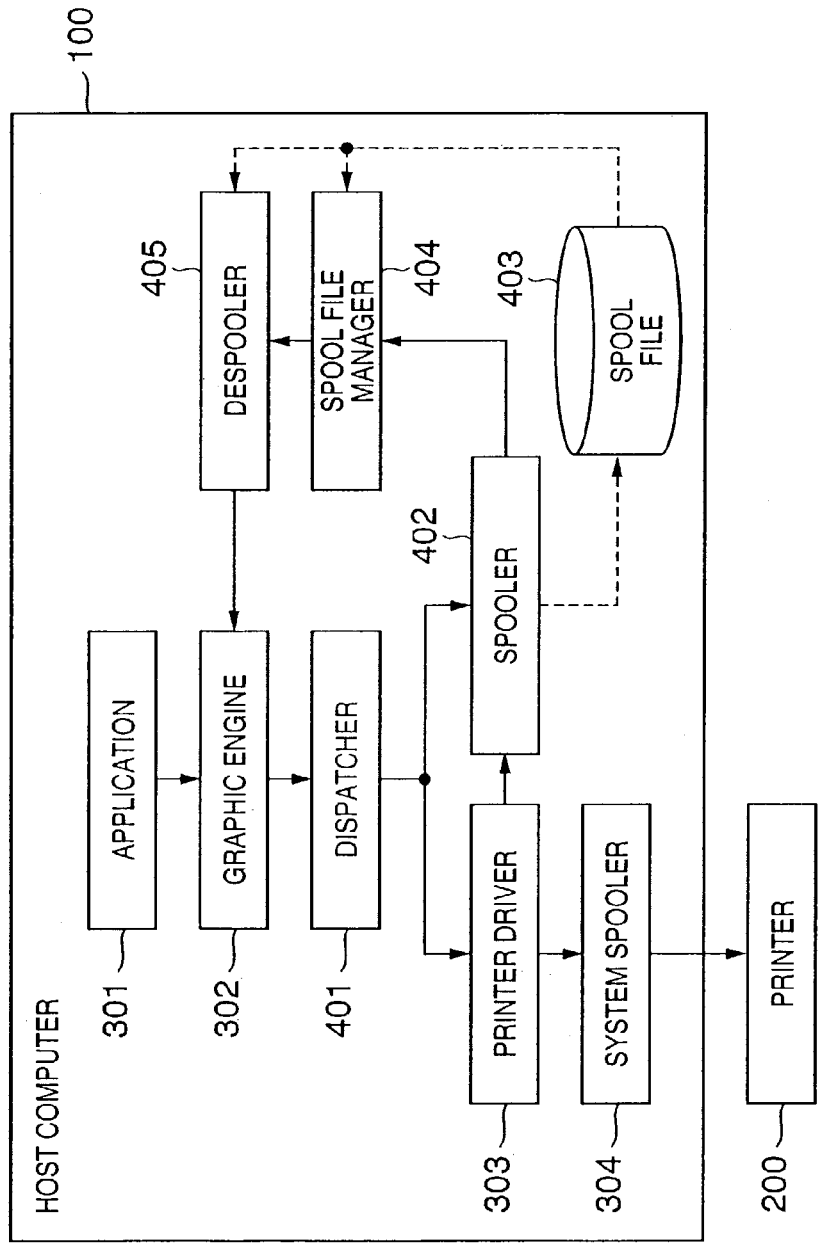
FIG. 3 is a block diagram that pertains to print processing functions in a host computer according to the embodiment.

The printer control system according to this embodiment further comprises an arrangement for temporarily spooling print data from the application as intermediate code data, as shown in FIG. 3, in addition to the print system which comprises the host computer 100 and printer 200 shown in FIGS. 1 and 2. The system shown in FIG. 3 is obtained by expanding the system shown in FIG. 2, and has an arrangement that temporarily generates a spool file 403 of an intermediate code upon sending a print command from the graphic engine 302 to the printer driver 303.

In the system shown in FIG. 2, the application 301 is released from the print process after the printer driver 303 has converted all print commands from the graphic engine 302 into control commands of the printer 200. By contrast, in the system shown in FIG. 3, the application 301 is released from the print process when a spooler 402 has converted all print commands into intermediate code data, and output them to the spool file 403. Normally, the latter process requires a shorter time than the former process. In the system shown in FIG. 3, the contents of the spool file 403 can be processed. As a result, functions such as an enlargement/reduction function, an N-up print function for printing a plurality of pages on one page in a reduced scale, and the like, that the application does not have can be implemented for print data from the application. For these purposes, the system is expanded to be able to spool as intermediate code data, as shown in FIG. 3, with respect to the system shown in FIG. 2.

In order to process print data, the user must make setups from a window provided by the printer driver 303, which must save the setup contents on the RAM 102 or external memory 111.

Details of FIG. 3 will be explained below. As shown in FIG. 3, in the expanded processing system, a print command from the graphic engine 302 is received by a dispatcher 401. If the dispatcher 401 determines that this print command is a print command issued from the application 301 to the graphic engine 302, it loads the spooler 402 stored in the external memory 111 onto the RAM 102, and sends the print command to the spooler 402 in place of the printer driver 303.

The spooler 402 converts the received print command into an intermediate code, and outputs it to the spool file 403. Also, the spooler 402 acquires processing setups associated with print data, which are set in the printer driver 303, from the printer driver 303, and saves them in the spool file 403. Note that the spool file 403 is generated as a file on the external memory 111, but may be generated on the RAM 102, as is easily understood by those who are skilled in the art. Furthermore, the spooler 402 loads a spool file manager 404 stored on the external memory 111 onto the RAM 102, and informs the spool file manager 404 of the generation state of the spool file 403. After that, the spool file manager 404 checks based on the processing setup contents saved in the spool file 403 if the printer driver 303 can generate print data. The spool file 403 manages intermediate data for respective logical pages, as pages output from the application. Furthermore, the spool file 403 also manages processing setups that the user has set in the printer driver 303, e.g., a margin print setup (rendering data is shifted and printed in an equal or reduced scale on a paper sheet of one page), and the like. Upon determining whether or not the printer driver 303 can generate print data, if all required logical pages are managed on the spool file 403 on the basis of the processing setups stored in the spool file 403, since data required to generate print data have been prepared, it can be determined that print data can be generated.

When the spool file manager 404 determines that the printer driver can generate print data using the graphic engine 302, it loads a despooler 405 stored in the external memory 111 onto the RAM 102, and instructs the despooler 405 to execute a print process of intermediate data described in the spool file 403. At this time, the spool file manager 404 also instructs influence information on logical pages upon the processing setups to the despooler 405.

For example, if a margin print setup has been made, the spool file manager 404 calculates position information indicating the print position of each logical page on a physical page, and size information indicating the size of each logical page on a physical page, and instructs influence information that contains the position information and size information to the despooler 405 for each logical page. Note that the position information calculation method will be described later using FIGS. 5 and 6.

The despooler 405 processes an intermediate code contained in the spool file 403 in accordance with the contents of the influence information instructed by the spool file manager 404, converts the processed intermediate data into a GDI function, and outputs it to the graphic engine 302.

The despooler 405 makes the following processes. The despooler 405 re-calculates the position and size of print data to be rendered within a logical page on a physical page on the basis of the logical page acquired from the spool file 403 and the influence information acquired from the spool file manager 404. For example, when an image is to be formed on a physical page while assuring a margin, the data size is changed in accordance with the stored margin setup. If margins of different amounts are to be assured on the right, left, upper, and lower sides, a margin amount half the maximum one of the margins to be assured on the four sides is calculated. According to this calculated margin amount, the respective sides of a rectangle bounded by the effective print range are shifted inwardly. A rectangle formed by shifting serves as a printable range. Within this printable range, print data can be laid out. Print data is reduced to a size that can fall within this printable range. In this embodiment, the margin amount is set to be ½ the maximum margin for the sake of simplicity. However, the present invention is not limited to such specific value, and this value may be changed. The despooler 405 converts intermediate data processed in this way into a GDI function, and outputs it to the graphic engine 302. With the above process, half the margin designated by the user can be obtained. In this connection, the remaining half margin is formed by sending an instruction to the printer 200. In this embodiment, a margin is formed in two stages, but may be formed in three or more stages.

The graphic engine 302 generates a DDI function based on the GDI function received from the despooler 405, and outputs a print command consisting of the DDI function to the dispatcher 401. If this print command is a print command of a GDI function, which has been issued from the despooler 405 to the graphic engine 302, the dispatcher 401 sends the print command to the printer driver 303 in place of the spooler 402. The printer driver 303 generates print data consisting of a printer control command on the basis of the received print command, and outputs the print data to the printer 200 via the system spooler 304.

Figure 4:
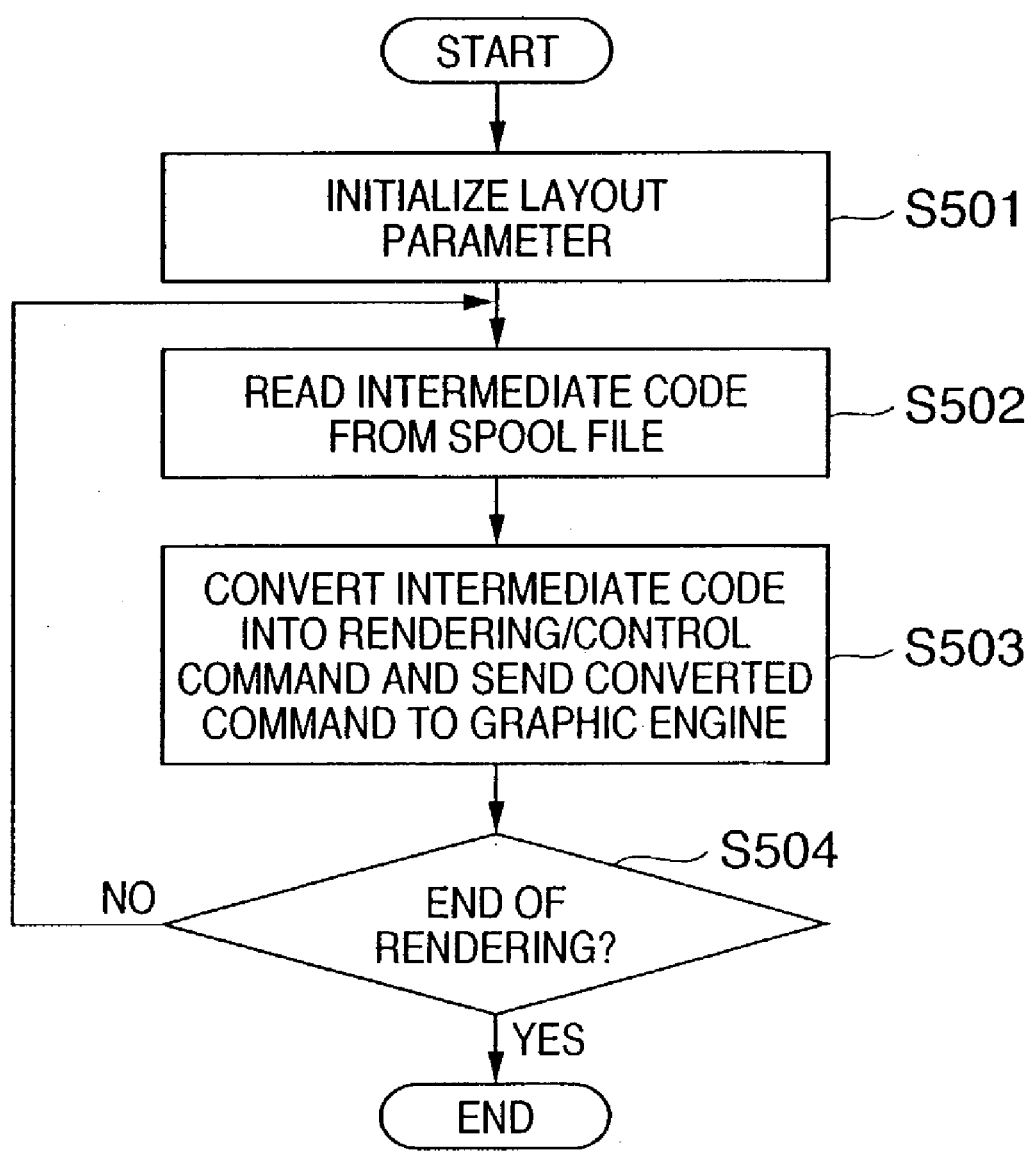
FIG. 4 is a flow chart showing the process of a despooler according to the embodiment.

A general process of the despooler 405 in the printer control system according to this embodiment with the aforementioned arrangement will be described in detail below mainly with reference to the flow charts shown in FIGS. 4 and 5. FIG. 4 is a flow chart showing the processing flow of the despooler 405. For the sake of simplicity, the following explanation will be given under the condition that processing setups other than the margin setup are not made. Of course, the processing setup of this embodiment may be combined with other processing setups.

In step S501, parameters such as an enlargement/reduction factor, the shift amount and direction of a rendering position, and the like, which are used in layout, are initialized. As initial values, an enlargement/reduction factor that indicates an equal magnification, and a rendering position free from any shift are preferably set. Since a layout process according to this embodiment is an optional process selected by the user, parameters for a normal process, which is to be executed frequently, are set as defaults, thus reducing the number of times of change in parameter setup.

In step S502, an intermediate code contained in the spool file 403 is read.

In step S503, the read intermediate code is processed to print data according to the processing setup contents contained in the spool file 403. Furthermore, a rendering command is output to the graphic engine 302 again.

It is checked in step S504 if all intermediate codes have been output, i.e., rendering is complete. As a result of checking, if rendering is complete, the processing ends; if intermediate codes to be output still remain, the flow returns to step S502 to process the next intermediate code.

Figure 5:
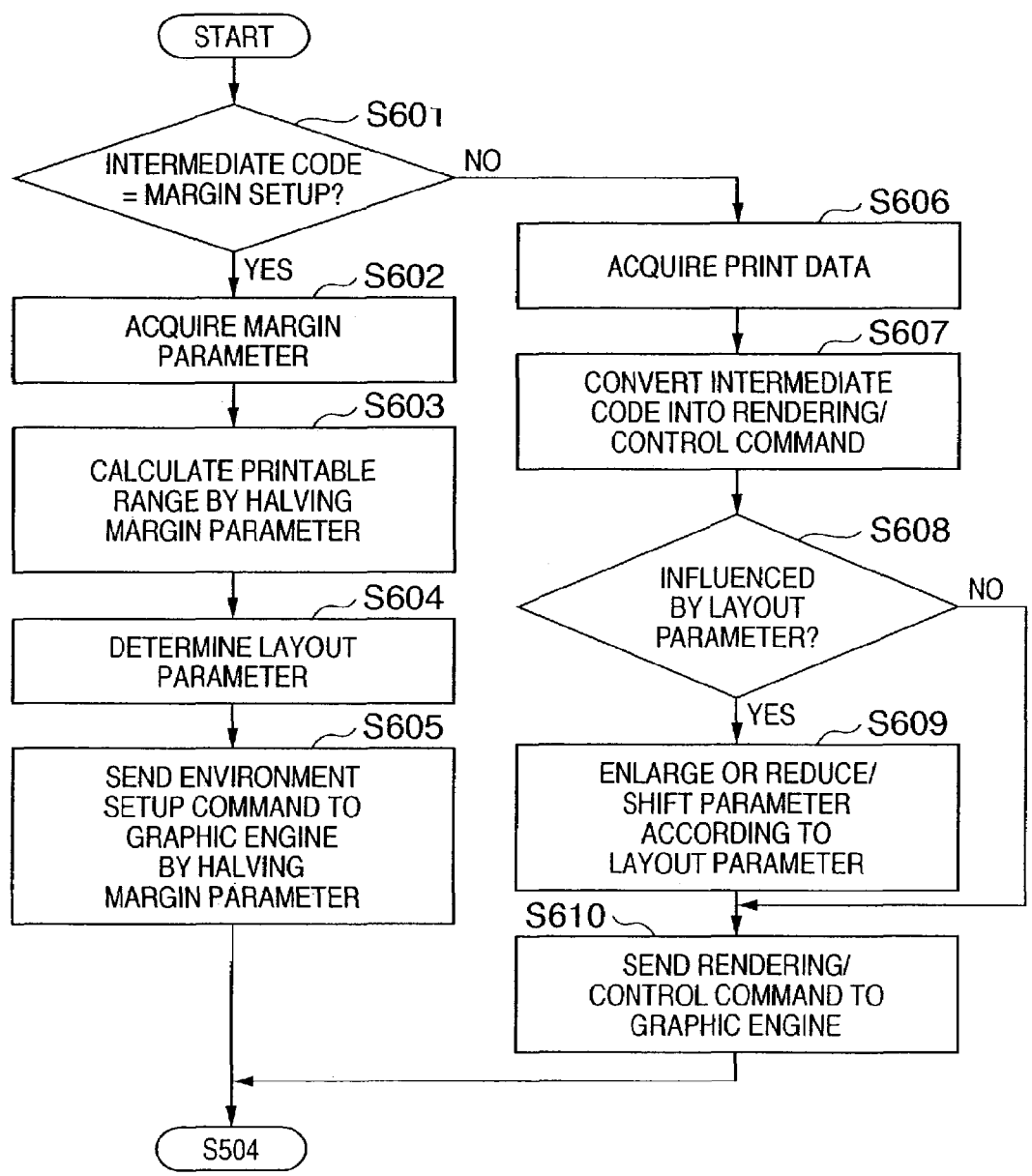
FIG. 5 is a flow chart showing the margin setup process according to the embodiment.

FIG. 5 is a flow chart showing the flow of the margin setup process as the core of this embodiment, and shows details of step S503 in FIG. 4.

In step S601, the type of intermediate code read in step S502 is checked. If the intermediate code is a margin parameter, the flow advances to step S602; otherwise, the flow advances to step S606.

In step S602, a margin parameter is acquired from the spool file 403.

In step S603, a range obtained by shifting the respective sides of an effective print range (normally, a rectangle) of the currently used paper size inwardly by an amount half the margin amount acquired in step S602 is obtained as a printable range.

Figure 6:
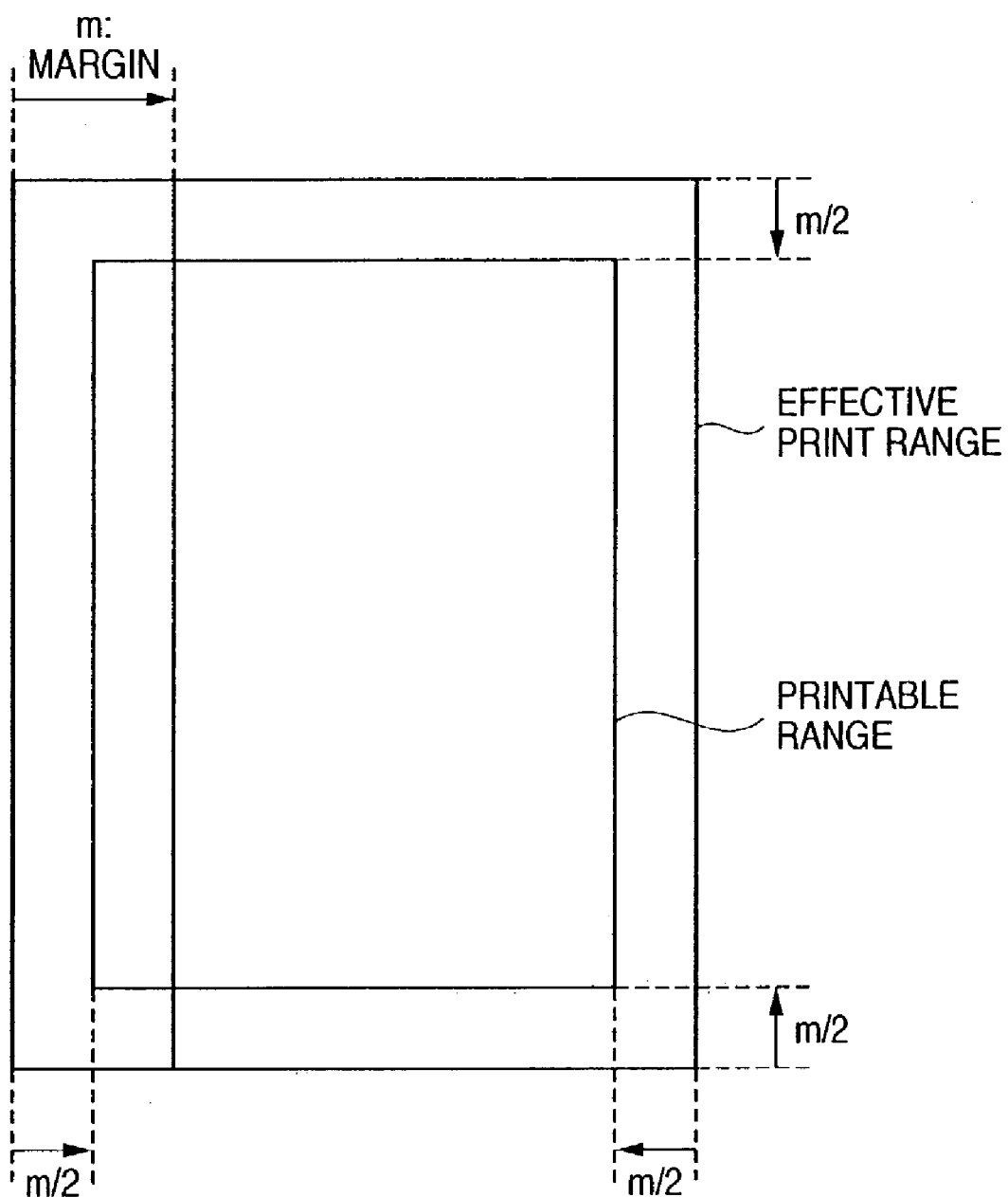
FIG. 6 is a schematic view of a printable range according to the embodiment.

FIG. 6 shows the calculation concept upon calculating the printable range in step S603. FIG. 6 shows a case wherein a margin of a target margin amount (m) is to be formed along the left side. In an initial stage, a range inside the respective sides of the effective print range by half (m/2) the target margin amount m irrespective of upper, lower, right, and left positions is calculated as a printable range.

Note that a margin normally indicates a margin from the edge of the effective print range, as shown in FIG. 6, and it may also mean a margin from the edge of a physical paper sheet. In the following description of this embodiment, a margin indicates the former one. If the latter margin is taken into consideration in the present invention, the former margin is obtained by defining a new "margin" by subtracting the distance from the edge of a physical paper sheet to the edge of the effective print range from the set margin. In the latter case, if the distance from the edge of a physical paper sheet to the edge of the effective print range is equal to the amount set as a margin, the "margin" is zero.

In step S604, a maximum enlargement/reduction factor at which the aspect ratio remains the same is calculated by comparing the printable range calculated in step S603 with the effective print range of a paper sheet to be used, so that print data can be printed within the printable range to have a maximum size without being distorted. Furthermore, in step S604 a print position in the printable range is determined on the basis of the enlargement/reduction factor and print data. Since the aspect ratio of the enlargement/reduction factor remains the same, a slight blank space may be formed in the up-and-down or right-and-left direction. This space may be used in various ways. For example, an image to be formed may be simply laid out at the upper left position of the printable range, or may be laid out at the center of the printable range. The layout position of an image is set by the user using the printer driver. In this manner, the enlargement/reduction factor and print position are determined.

In step S605, a print environment setup command set with the remaining half margin amount (m/2) which is not processed yet is sent to the graphic engine. Of course, the printer driver 303 converts this print environment setup command into a printer command that the printer 200 can interpret, and the print command is sent to the printer 200. Upon receiving this command, the printer 200 shifts the corresponding page by the designated amount in the designated direction and prints that page. For example, in the example in FIG. 6, an instruction is issued to print a page while shifting it by m/2 to the right.

On the other hand, if it is determined in step S601 that the intermediate code is other than a margin parameter, the flow advances to step S606. In step S606, print data is acquired from the spool file 403. In step S607, the print data as the acquired intermediate code is converted into a rendering command or print control command. It is checked in step S608 if the converted rendering command or print control command is influenced by layout parameters. If the command is influenced by layout parameters, the flow advances to step S609, and a parameter that requires layout conversion undergoes layout conversion using the layout parameters determined in step S604. This layout conversion requires an enlargement/reduction function, and a rendering position shift function. After the aforementioned processes, the rendering command or print control command is sent to the graphic engine in step S610.

FIG. 7 is a schematic view for explaining how to lay out image data on the effective print range. An original image is reduced and shifted by the despooler 405 to fall within the printable range. At this time, half the set margin is reflected. Furthermore, this image data is shifted by the remaining half margin amount in the designated direction in the printer 200. In these two steps, the target margin m of user's choice can be added to a print.

That is, according to this embodiment, the printable range is formed by narrowing all the upper, lower, right, and left sides of the effective print range by half the designated margin, print data that has been enlarged/reduced to fall within the printable range is rendered, and the printer 200 adds the remaining half margin. As a result, since no rendering takes place outside the effective print range, an image can be prevented from being interrupted by the set margin.

In the above description, a simple margin has been explained. This margin may be a margin amount upon punching holes, or may be a margin position upon two- or Z-folding a paper sheet, or may be a margin amount upon stapling paper sheets.

Figure 8C:
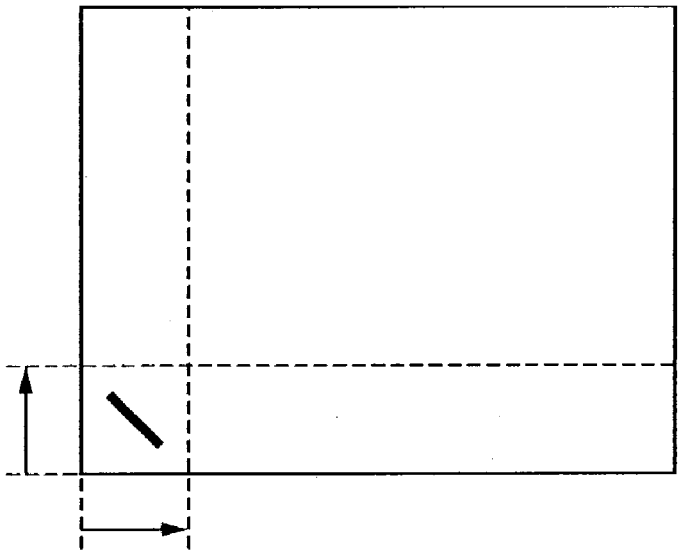
FIG. 8C shows an application example when the binding margin amount is used in a staple process.
Figure 8B:
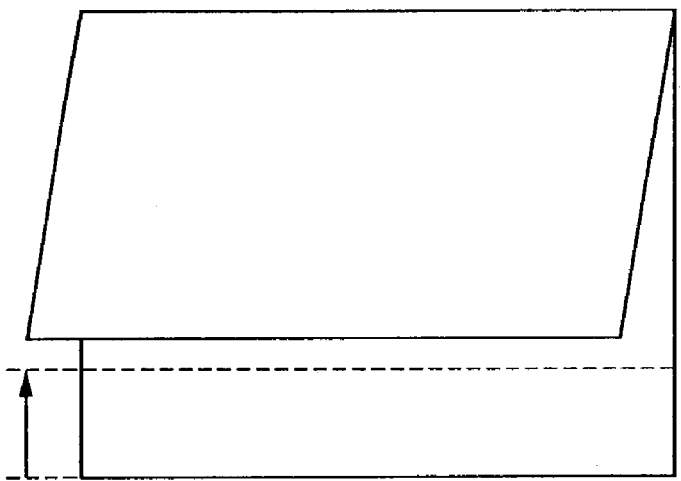
FIG. 8B shows an application example when the binding margin amount is used in a fold process.
Figure 8A:
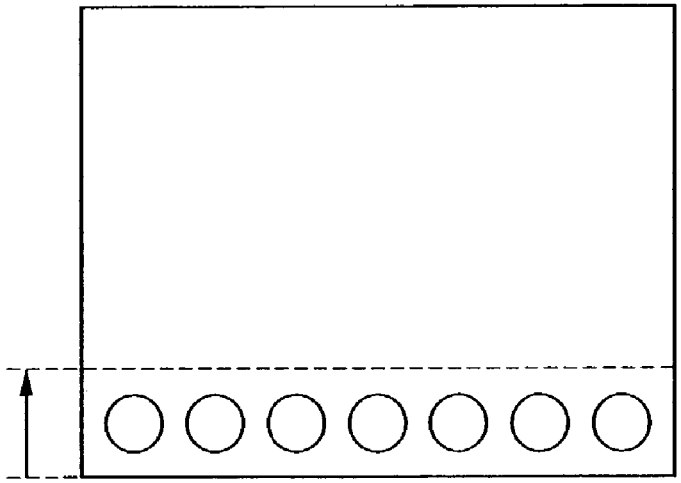
FIG. 8A shows an application example when the binding margin amount is used in a punch process.

FIGS. 8A to 8C show layout examples when the binding margin amount is used for purposes other than a margin. Upon stapling a paper sheet in FIG. 8C, the printer 200 shifts an image in two directions, i.e., right and lower directions. In this invention, since rendering is done only in a range obtained by narrowing the effective print range by half the set margins in the upper, lower, right, and left directions, even when the printer 200 shifts the image by the remaining margin amounts in a plurality of directions, rendering is never done outside the effective print range.

As described above, according to this embodiment, an image can be prevented from falling outside the effective print range irrespective of the binding margin positions depending on various mechanical conditions of the printing apparatus side.

Second Embodiment

When a binding margin is added to a print job consisting of pages with a plurality of paper sizes and print directions, various combinations are logically available. Since these combinations are determined based on various conditions of the printer 200, and paper feed and exhaust mechanisms, a binding method that the user did not intend may be selected in some situations.

Hence, by providing a setup window which limits combinations of paper sizes and their binding methods to some extent, and displays them to the user, data can be output in a combination of user's choice.

Figure 9:
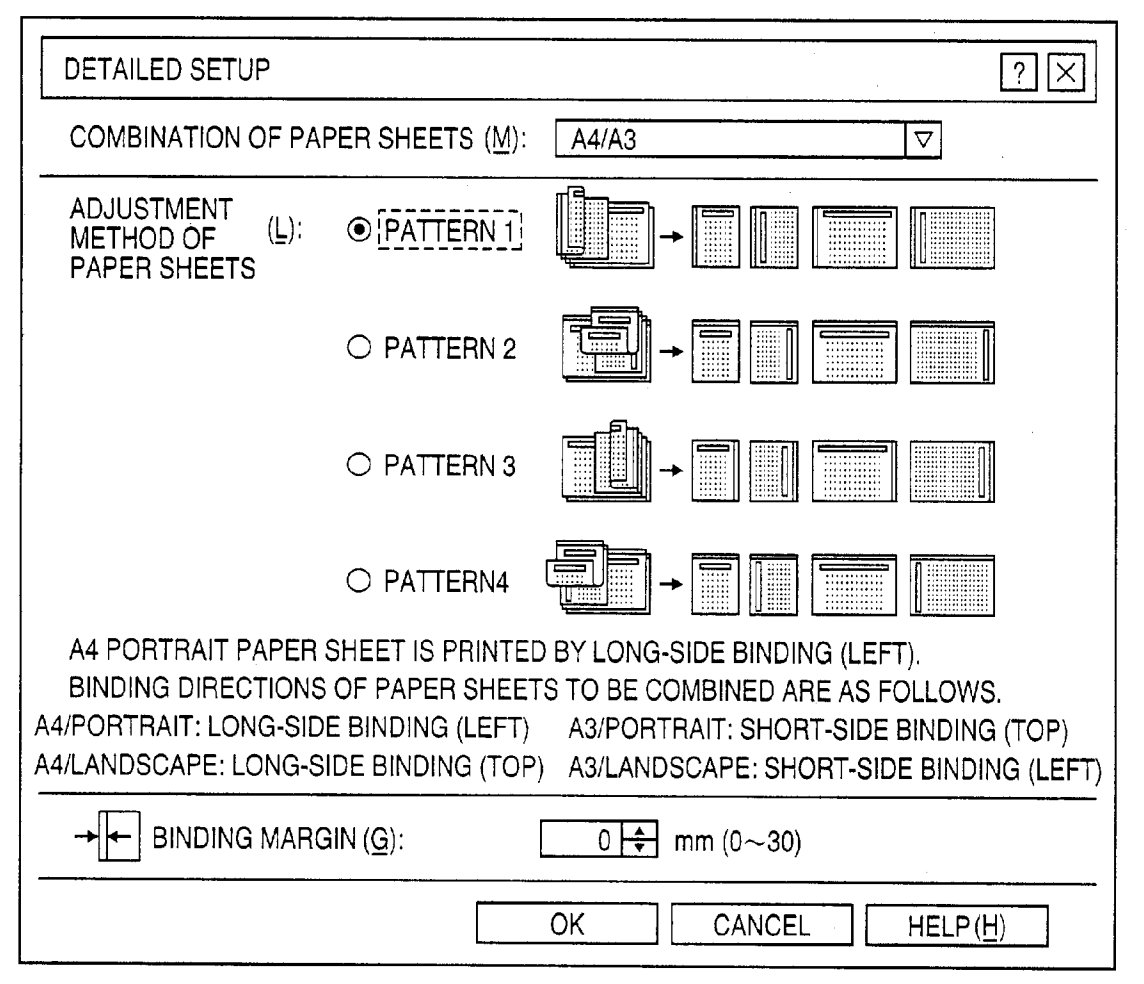

FIG. 9 shows an example of a binding margin setup window when various paper sheets are used. As shown in FIG. 9, if combinations of paper sheets are limited (e.g., only a combination of A4 and A3 sheets), when the print directions (landscape, portrait) and binding margin positions of respective paper sheets are displayed as examples, the user selects a combination of paper sheets, print directions, and binding margins from selectable combinations, thus setting a binding margin position of his or her choice. In this example, the directions (up-and-down and right-and-left directions) of images to be printed on A4 portrait and A3 landscape pages, and A4 landscape and A3 portrait pages are adjusted in identical directions. When a two-sided print function is available, the user can easily image a pattern upon adjusting prints by displaying the up-and-down relationship upon printing reverse faces.

Another Embodiment

Note that the present invention may be applied to either a system constituted by a plurality of devices (e.g., a host computer, interface device, reader, printer, and the like), or an apparatus consisting of a single equipment (e.g., a copying machine, facsimile apparatus, or the like).

The objects of the present invention are also achieved by supplying a storage medium (or recording medium), which records a program code of a software program that can implement the functions of the above-mentioned embodiments to the system or apparatus, and reading out and executing the program code stored in the storage medium by a computer (or a CPU or MPU) of the system or apparatus. In this case, the program code itself read out from the storage medium implements the functions of the above-mentioned embodiments, and the storage medium which stores the program code constitutes the present invention. The functions of the above-mentioned embodiments may be implemented not only by executing the readout program code by the computer but also by some or all of actual processing operations executed by an operating system (OS) running on the computer on the basis of an instruction of the program code.

Furthermore, the functions of the above-mentioned embodiments may be implemented by some or all of actual processing operations executed by a CPU or the like arranged in a function extension card or a function extension unit, which is inserted in or connected to the computer, after the program code read out from the storage medium is written in a memory of the extension card or unit.

When the present invention is applied to the storage medium, that storage medium stores program codes corresponding to the flow charts shown in FIGS. 4 and 5 mentioned above.

According to the present invention, since control is made to form a partial amount of a required margin on the information processing apparatus side and to form the remaining margin on the printing apparatus side, conditions unique to each printing apparatus can be taken into consideration. Hence, an image can be prevented from falling outside the effective print range irrespective of the binding margin positions depending on various mechanical conditions of the printing apparatus side.

Some typical patterns of binding margin positions upon setting a binding margin in a print job that includes a plurality of paper sizes or a plurality of print directions are presented, and the user selects one of these patterns. Hence, the user can easily image a layout upon binding print results.

The present invention is not limited to the above embodiments and various changes and modifications can be made within the spirit and scope of the present invention. Therefore, to apprise the public of the scope of the present invention, the following claims are made.

What is claimed is:

1. An information processing apparatus for controlling an image forming apparatus to form an image on an arbitrary medium after executing a layout process in advance, comprising:

a setting component for setting a first margin amount associated with a margin area to be assured on the medium;

an enlargement/reduction component for enlarging or reducing data associated with the image in accordance with a second margin amount smaller than the first margin amount; and an instruction component for instructing the image forming apparatus to form the image on the medium on the basis of the enlarged or reduced data to have a third margin amount obtained by a calculation using the first and second margin amounts.

2. The apparatus according to claim 1, wherein the first margin amount is a margin amount associated with a binding margin, punch process, two fold process, Z fold process, or stapling process.

3. The apparatus according to claim 1, wherein the second margin amount is approximately half the first margin amount.

4. The apparatus according to claim 1, further comprising a calculation component for calculating a printable range, which is reduced in accordance with the second margin amount, from an effective print range of the medium, wherein said enlargement/reduction component executes enlargement or reduction so as to make the data associated with the image fall within the printable range.

5. The apparatus according to claim 1, wherein said instruction component gives to the image forming apparatus instruction information associated with a side or direction in which the third margin amount is to be assured.

6. An image formation control method for controlling an image forming apparatus to form an image on an arbitrary medium after executing a layout process in advance, comprising the steps of:

setting a first margin amount associated with a margin area to be assured on the medium;

enlarging or reducing data associated with the image in accordance with a second margin amount smaller than the first margin amount; and controlling the image forming apparatus to form the image on the medium on the basis of the enlarged or reduced data to have a third margin amount obtained by a calculation using the first and second margin amounts.

7. The method according to claim 6, wherein the first margin amount is a margin amount associated with a binding margin, punch process, two fold process, Z fold process, or stapling process.

8. The method according to claim 6, wherein the second margin amount is approximately half the first margin amount.

9. The method according to claim 6, further comprising the step of calculating a printable range, which is reduced in accordance with the second margin amount, from an effective print range of the medium, wherein the enlargement/reduction step includes the step of executing enlargement or reduction so as to make the data associated with the image fall within the printable range.

10. The method according to claim 6, wherein the control step includes the step of instructing the image forming apparatus in information associated with a side or direction in which the third margin amount is to be assured.

11. An information processing apparatus for sending print data to a printing apparatus, comprising:
  a setting component for setting a binding margin for at least one side of the paper sheet;
  a calculation component for calculating a printable range by subtracting, respectively, an amount ½ the set binding margin from the edges of both sides of an effective print range of the paper sheet;
  an enlargement/reduction component for enlarging/reducing data to be printed in correspondence with the printable range; and
  a generation component for generating print data based on the enlarged/reduced data and for generating a print setting command for instructing an amount ½ the set binding margin.

12. The apparatus according to claim 11, further comprising:
  a display component for displaying some possible combinations of binding margin positions when a plurality of pages having different paper sizes or a plurality of pages having different paper directions mix; and
  a designation component for designating one of the displayed combinations,
  wherein said setting component sets the binding margin on the basis of the designated combination.

13. A computer-readable storage medium storing a computer-executable program for controlling an image forming apparatus to form an image on an arbitrary medium after executing a layout process in advance, said program comprising:
  a module for setting a first margin amount associated with a margin area to be assured on the medium;
  a module for enlarging or reducing data associated with the image in accordance with a second margin amount smaller than the first margin amount; and
  a module for instructing the image forming apparatus to form the image on the medium on the basis of the enlarged or reduced data to have a third margin amount obtained by a calculation using the first and second margin amounts.

14. A computer-readable storage medium storing a computer-executable program for sending print data to a printing apparatus, said program comprising:
  a setting component for setting a binding margin for at least one side of the paper sheet;
  a calculation component for calculating a printable range by subtracting, respectively, an amount ½ the set binding margin from the edges of both sides of an effective print range or the paper sheet;
  an enlargement/reduction component for enlarging/reducing data to be printed in correspondence with the printable range; and
  a generation component for generating print data based on the enlarged/reduced data and for generating a print setting command for instructing an amount ½ the set binding margin.

* * * * *